United States Patent [19]

Tanaka

[11] Patent Number: 5,080,419
[45] Date of Patent: Jan. 14, 1992

[54] BRACKET

[75] Inventor: Yuji Tanaka, Kanagawa Prefecture, Japan

[73] Assignee: Ikeda Bussan Co., Ltd., Ayase, Japan

[21] Appl. No.: 612,468

[22] Filed: Nov. 14, 1990

[30] Foreign Application Priority Data

Mar. 30, 1990 [JP] Japan .................. 2-34413[U]

[51] Int. Cl.⁵ .................................. B60N 1/10
[52] U.S. Cl. .................. 296/65.1; 296/39.1; 248/397; 248/503
[58] Field of Search ........... 296/63, 65.10, 39.1; 248/503, 397; 297/326

[56] References Cited

U.S. PATENT DOCUMENTS 4,133,556  1/1979  Glinski .................. 296/65.1
4,191,417  3/1980  Ferrara ................. 296/65.1

FOREIGN PATENT DOCUMENTS 4,805,953  2/1989  Yamauchi .............. 296/65.1
2471162   6/1981  France .................. 296/65.1

*Primary Examiner*—Robert R. Song
*Attorney, Agent, or Firm*—Foley & Lardner

[57] ABSTRACT

A bracket for pivotally supporting a front leg of a foldable seat of a motor vehicle is disclosed, which comprises a base portion; side wall portions extending perpendicularly from opposed side ends of the base portion; a pivot shaft passing through aligned openings formed in the side wall portions; a structure defining in the base portion a plurality of openings, each opening being rimmed by a circular bank; and a structure defining on the base portion a semi-cylindrically raised portion. The raised portion and the circular bank are formed on a same surface of the base portion.

5 Claims, 4 Drawing Sheets

BRACKET

BACKGROUND OF THE INVENTION

1. Field of the Invention

The present invention relates in general to brackets, and more particularly, to brackets of a type which are designed to connect a structure to a vehicle floor. More specifically, the present invention is concerned with brackets of a type which pivotally connect a front leg of a foldable seat to a vehicle floor which is covered with a rug.

2. Description of the Prior Art

In order to clarify the task of the present invention, one conventional bracket of the above-mentioned type will be described with reference to FIG. 5 of the accompanying drawings.

FIG. 5 illustrates the prior art. A floor has a raised surface portion with an inclined wall portion (no numeral). The vehicle floor 1 is covered with a rug 1a. A mounting zone 2 to which the bracket 4 is to be secured is shown. The mounting zone 2 is a portion 3 of the inclined wall portion which is exposed to the outside through a rectangular opening (no numeral) formed through the rug 1a. The portion 3 has two bolt openings (no numerals).

The bracket 4 pivotally holds a front leg 9 of a foldable seat mounted on the raised surface portion of the vehicle floor 1. (This arrangement will be understood from FIG. 3). The bracket 4 comprises a generally rectangular base portion 5 and a generally rectangular raised portion 6. The base portion 5 has side walls (no numerals) for stably receiving a lower portion of the front leg 9 when the seat assumes a normal operative position. (This will be understood when viewing FIG. 3.) The raised portion 6 is shaped to match the rectangular opening of the rug 1a. The raised portion 6 has two bolt openings (no numerals).

Upon assembly, the bracket 4 is placed on the mounting zone 2 having the raised portion 6 neatly inserted into the rectangular opening of the rug 1a, and two bolts 8 are inserted into aligned bolt openings and fastened with the aid of nuts (not shown) welded to the back surface of the inclined wall portion. The base portion 7 of the bracket 4 presses a peripheral portion of the rectangular opening of the rug 1a against the inclined wall portion of the floor 1.

However, due to its inherent construction, the bracket 4 has the following drawbacks.

First, when an external force is suddenly applied to, the rug 1a near the bracket 4 due to for example, rushed ingress of a passenger, the peripheral portion of the opening of the rug 1a tends to slip out of place causing exposure of an unsightly cut edge of the rug 1a to the outside. This detracts from the external appearance of the vehicle floor.

Second, since any load applied to the front leg 9 of the seat is received by only the exposed portion of the vehicle floor to which the raised portion 6 of the bracket 4 contacts, it becomes necessary to reinforce the vehicle floor, particularly, at the exposed portion 3. This not only increases the weight of the vehicle but also increases the production cost.

SUMMARY OF THE INVENTION

It is, therefore, an object of the present invention to provide a bracket which is free of the above-mentioned drawbacks.

According to a first aspect of the present invention, there is provided a bracket which comprises a base portion; side wall portions extending perpendicularly from opposed side ends of the base portion; means defining in the base portion a plurality of openings, each opening being rimmed by a circular bank; and means defining on the base portion a semi-cylindrically raised portion, the raised portion and the circular bank being formed on a same surface of the base portion.

According to a second aspect of the present invention, there is provided, in a motor vehicle having a floor covered with a rug, a structure adapted to be mounted to the floor; mounting portion including a plurality of circular portions of the floor which are exposed to the outside through respective circular openings formed through the rug; a bracket having a portion of the structure pivotally connected thereto and including a base portion; side wall portions extending perpendicularly from opposed side ends of the base portion; means defining in the base portion a plurality of openings, each opening being rimmed by a circular bank; and means defining on the base portion a semi-cylindrically raised portion, the raised portion and the circular bank being formed on a same surface of the base portion; and securing means for securing the bracket to the mounting portion in such a manner that the circular banks of the base portion are coaxially received in the circular openings of the rug and that the semi-cylindrically raised portion is pressed against the rug.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
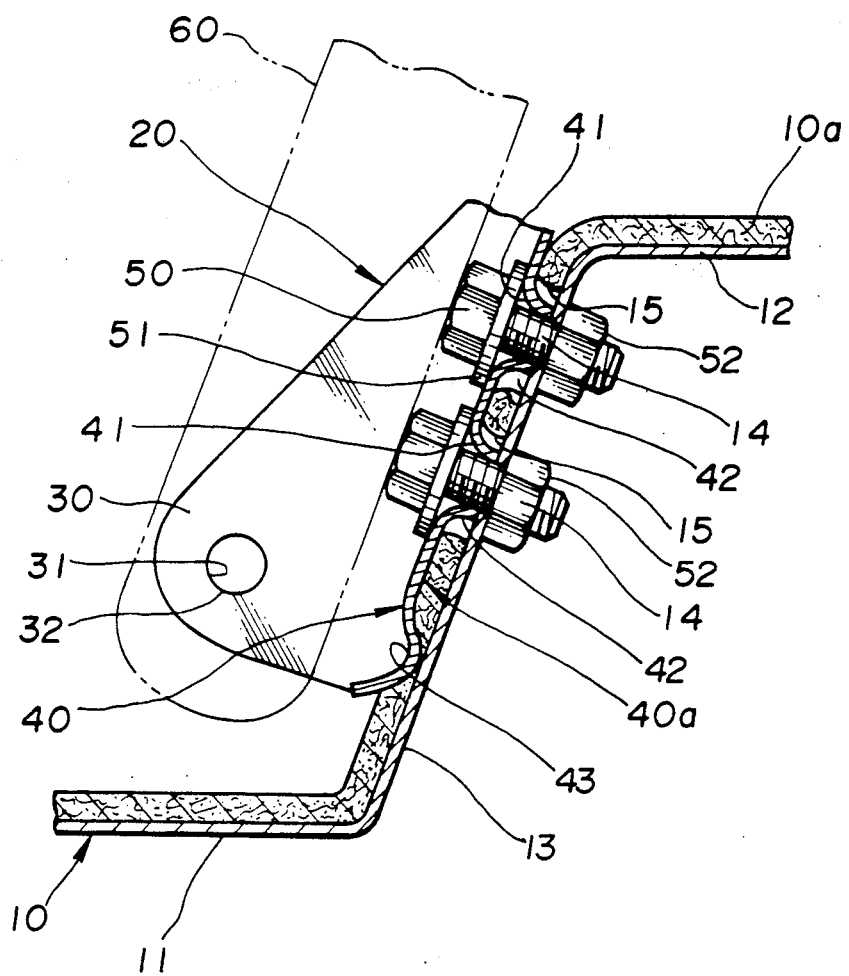
FIG. 1 is a sectional view of a bracket of the present invention in a condition wherein the bracket is properly mounted to a vehicle floor.
Figure 2:
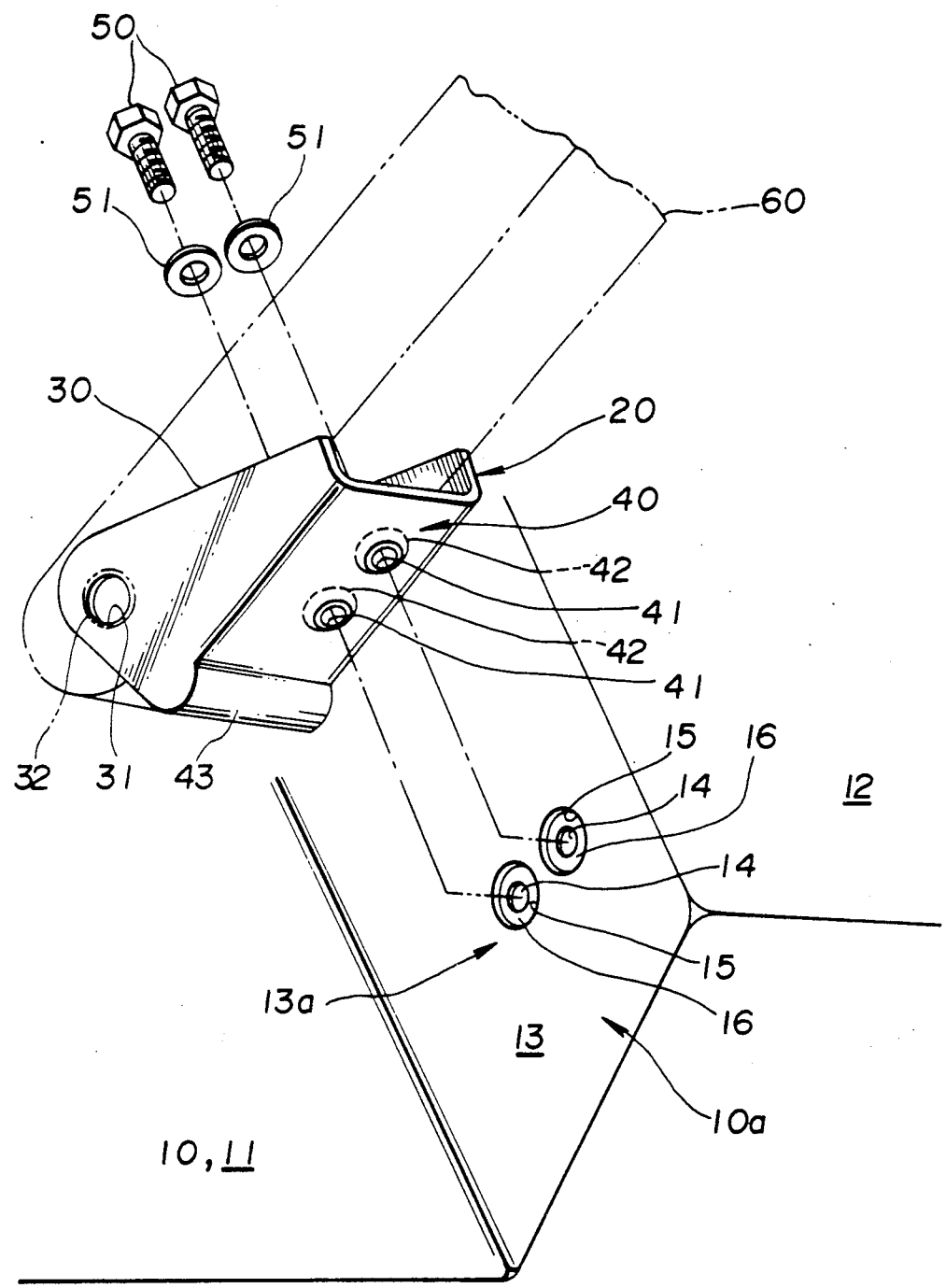
FIG. 2 is a perspective view of the bracket in a condition wherein the bracket is dismantled from the vehicle floor.

Referring through FIGS. 1 to 4, particularly FIGS. 1 and 2, there is shown a bracket 20 of the present invention, which is illustrated to be used for pivotally supporting a foldable seat of a motor vehicle.

Figure 3:
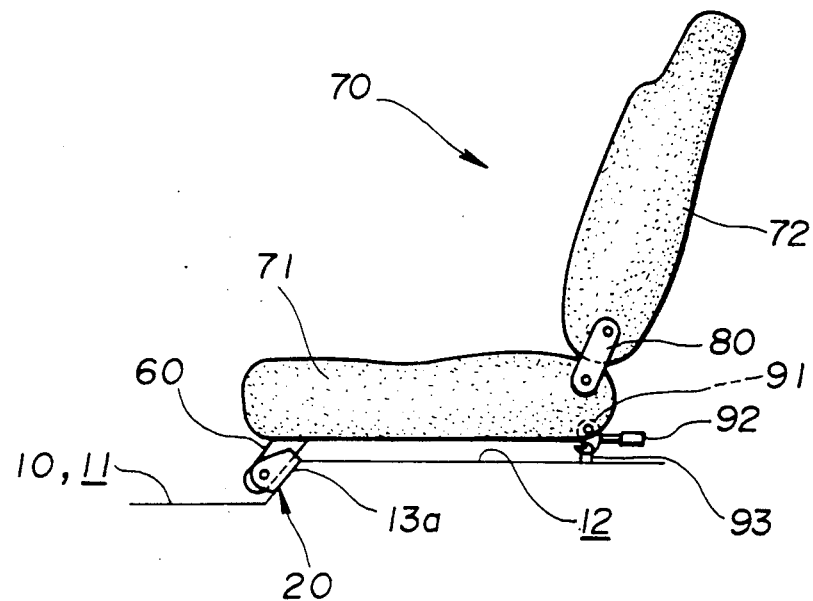
FIG. 3 is a side view of a vehicular seat to which the bracket of the present invention is practically applied.

In the drawings, a vehicle floor 10 is shown which, as is well seen from FIG. 3, comprises a major surface portion 11, a raised surface portion 12 and an inclined wall portion 13 defined between the major and raised surface portions 11 and 12. The vehicle floor 10 is entirely covered with a rug 10a.

As will be seen from FIG. 3, two identical brackets 20 of the invention are employed for supporting a seat 70 in a manner as will be described hereinafter.

The seat 70 comprises a seat cushion 71 and a seatback 72. The seat cushion 71 has two front legs 60 secured thereto. The front legs 60 are pivotally connected to the two brackets 20. A seatback reclining device 80 is disposed between the seat cushion 71 and the seatback 72 to adjust the angular position of the seatback 72 relative to the seat cushion 71. The seat cushion 71 has at its rear lower portion a pivotal latching pawl 91 which is equipped with a control knob 92. A striker 93 is secured to the raised surface portion 12 of the vehicle floor 10 to latchingly catch the latching pawl 91 when the seat 70 assumes a normal operative position. The latching pawl 91 is biased by a spring (not shown) in a direction to achieve the latching engagement with the striker 93.

Figure 4:
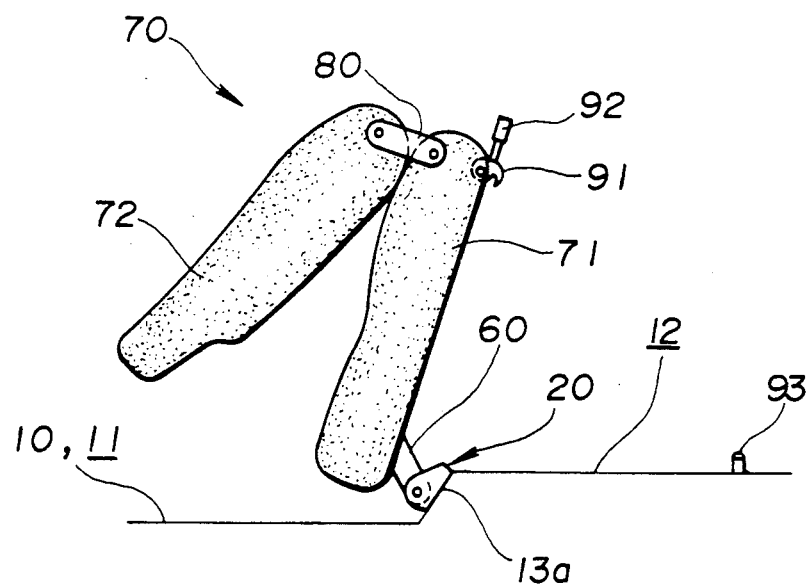
FIG. 4 is a view similar to FIG. 3, but showing a condition wherein the seat is folded.
Figure 5:
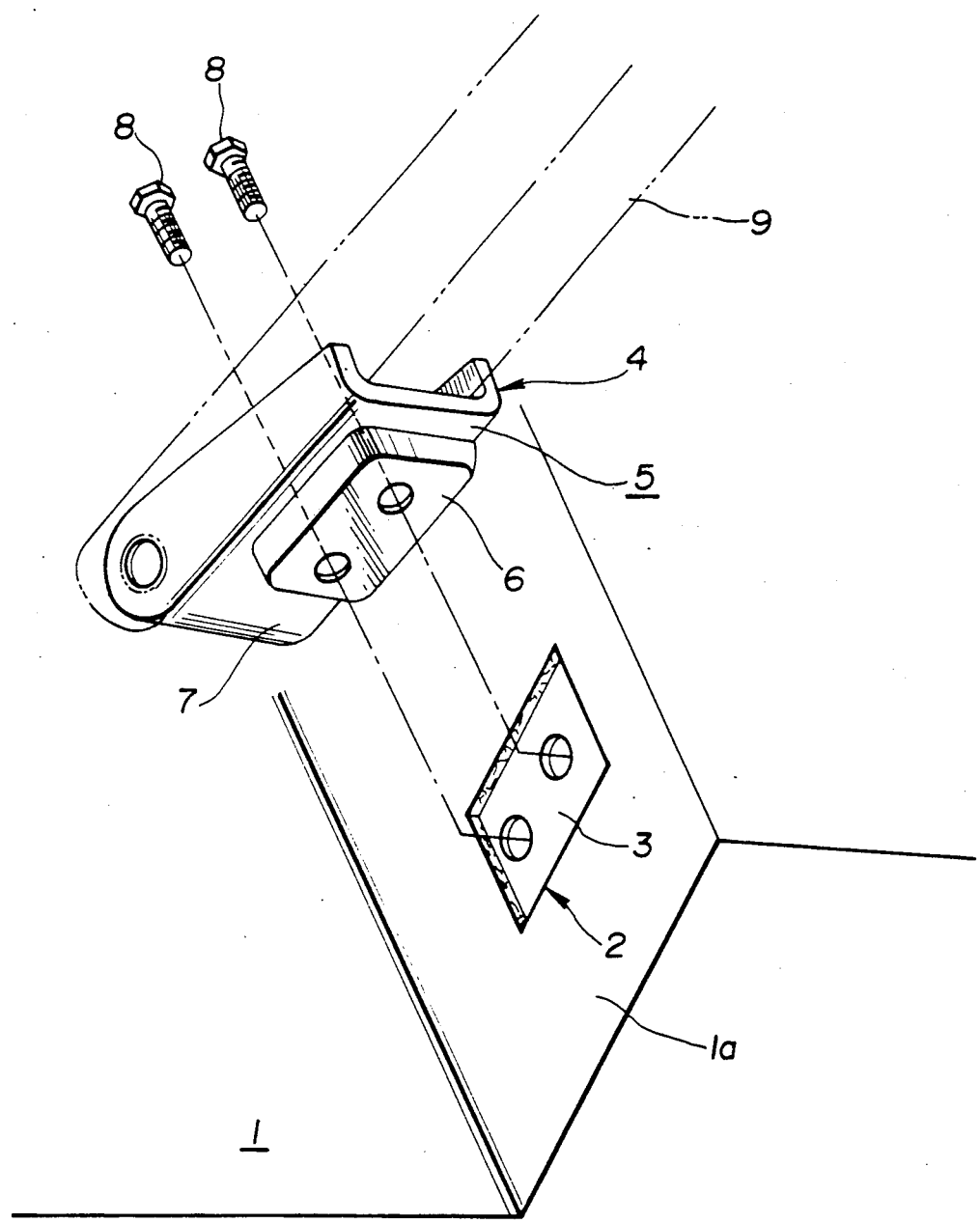
FIG. 5 is a view similar to FIG. 2, but showing a conventional bracket.

As will become apparent as the description proceeds, when the control knob 92 is pulled up to disengage the latching pawl 91 from the striker 93, the entire of the seat 70 is permitted to pivot forward about the brackets 20, as is seen from FIG. 4. Thus, in this seat-folded condition, the raised surface portion 11 of the vehicle floor 10 can serve as a 10 baggage carrying floor.

A mounting zone 13a is shown in FIGS. 2 and 3 to which one bracket 20 of the invention is mounted. As is seen from FIG. 2, the mounting zone 13a has two spaced circular portions 16 of the inclined wall portion 13, which are exposed to the outside through respective circular openings 15 formed through the rug 10a. Each exposed portion 16 is formed with a bolt opening 14.

The two brackets 20 pivotally hold the two front legs 60 of the seat 70 (see FIG. 3).

Each bracket 20 is constructed by bending a metal and comprises a generally rectangular base portion 40 and generally triangular side wall portions 30. Thus, the bracket 20 is shaped to have a generally U-shaped cross section. The side wall portions 30 are formed with aligned openings 31 through which a pivot shaft 32 passes for pivotally connecting the front leg 60 of the seat 70 with the bracket 20.

As is seen from FIG. 2, the base portion 40 has two spaced openings 41 formed therethrough. Preferably, these two openings 41 are located on a longitudinal axis of the base portion 40. Each opening 41 is rimmed by a circular bank 42 which is projected, as shown. The banks 42 are shaped to match with the circular openings 15 of the rug 10a. The height of each bank 42 is substantially equal to the thickness of the rug 10a.

The base portion 40 further has a semi-cylindrically raised portion 43 at its lower end, which extends perpendicularly to the longitudinal axis of the base portion 40, as shown.

Upon requirement of assembly, each bracket 20 is placed on the mounting zone 13a having the circular banks 42 coaxially inserted into the circular openings 15 of the rug 10a, and two bolts 50 are inserted into the aligned bolt openings 41 and 14 and fastened with the aid of nuts 52 (see FIG. 1) and washers 51.

As assembled, the top of each circular bank 42 is tightly pressed against the circular exposed portion 16 of the inclined wall portion 13 of the vehicle floor 10, and the semi-cylindrically raised portion 43 is tightly pressed against the inclined wall portion 13 with an interposal of the rug 10a therebetween.

The advantages of the bracket 20 of the invention are described below.

First, because of provision of the semi-cylindrically raised portion 43, the attachment of tight bracket 20 to the mounting portion 13a can be realized by the fastening bolts 50. In fact, upon assembly, the raised portion 43 strongly presses the rug 10a against the inclined wall portion 13 of the vehicle floor 10. Thus, the afore-mentioned "slip out" phenomenon of the rug 10a is prevented or at least minimized.

Second, because of provision of the semi-cylindrically raised portion 43, the substantive contacting surface between the bracket 20 and mounting portion 13a is greater than that of the afore-mentioned conventional bracket 4. Any load applied to the front leg 60 of the seat is received by not only the circular exposed portions 16 of the inclined wall portion 13 but also the portion of the wall portion 13 against which the semi-cylindrically raised portion 43 is pressed with an interposal of the rug 10a therebetween. Thus, it becomes unnecessary to reinforce the vehicle floor 10.

Third, because the circular bank 42 of each opening 41 of the bracket 20 can be made very small as compared with the rectangular raised portion 6 of the conventional bracket 4, the openings 15 formed in the rug 10a can be substantially smaller than the rectangular opening of the conventional device. This ensures increased strength of the rug 10a.

What is claimed is:

1. In a motor vehicle having a floor covered with a rug,
   a structure adapted to be mounted to said floor;
   a mounting portion including a plurality of circular portions of said floor which are exposed to the outside through respective circular openings formed through said rug;
   a bracket, having a portion of said structure pivotally connected thereto, comprising a base portion, means defining in said base portion a plurality of openings, each of said openings being rimmed by a circular bank, and means defining on said base portion on a semi-cylindrically raised portion, said raised portion and said circular bank being formed on a same surface of said base portion; and
   securing means for securing said bracket to said mounting portion in such a manner that the circular banks of said base portion are coaxially received in said circular openings of said rug and that the semi-cylindrically raised portion is pressed against said rug.

2. A motor vehicle as claimed in claim 1, in which said structure is a foldable seat, said seat having a leg having a lower end which is pivotally connected to said bracket.

3. A motor vehicle as claimed in claim 2, in which said bracket further comprises side walls which extend perpendicularly from opposed side ends of said base portion, and a pivot shaft, for pivotally connected said leg to said bracket said pivot shaft passing through aligned openings formed in said side wall.

4. A motor vehicle as claimed in claim 3, in which said circular portions of said floor are formed with respective openings which become in alignment with the openings of said base portion when said bracket is properly positioned with respect to said mounting portion.

5. A motor vehicle as claimed in claim 4, in which said securing means comprises bolts, nuts and washers, each of said bolts being inserted through the aligned openings of said circular portions of the floor and the base portion and fastened with an aid of said washer and said nut.

* * * * *